Patented Aug. 1, 1939

2,167,997

UNITED STATES PATENT OFFICE 2,167,997

PREPARATION OF METAL PERCARBONATES

Joseph S. Reichert, Niagara Falls, N. Y., assignor to E. I. du Pont de Nemours & Company, Wilmington, Del., a corporation of Delaware No Drawing. Application February 16, 1938, Serial No. 190,834

19 Claims. (Cl. 23—62)

This invention relates to the preparation of metal percarbonates and more particularly to an improved and economical method for preparing alkali metal percarbonates, e. g., sodium percarbonate.

Numerous methods have been proposed and described in the literature for the preparation of alkali metal percarbonates and varous formulae have been suggested as being representative of the products obtained by such methods. The so-called true percarbonates, e. g., potassium percarbonate, having the formula $K_2C_2O_6$, are said to be obtained by electrolytic methods while percarbonates containing active oxygen in the form of hydrogen peroxide of addition have been prepared, usually by reacting the alkali metal carbonate with hydrogen peroxide. Because of the relative cheapness of sodium carbonate, sodium percarbonates have received the chief consideration in previous studies. From these studies it appears that the compound represented by the formula $Na_2CO_3 \cdot 1.5H_2O_2$ is the only sodium percarbonate of the many reported whose properties render it of interest from a commercial standpoint.

The only methods known heretofore for preparing alkali metal percarbonates which have warranted more than passing consideration from a commercial standpoint involve the use of the metal carbonate, e. g., sodium carbonate, as a starting material. Generally the preparation is carried out in an aqueous solution using hydrogen peroxide as the source of the active oxygen. Such method of production is relatively costly and places the percarbonate obtained at a disadvantage economically as compared with other commercially available, relatively cheap peroxygen compounds, e. g., sodium perborate. This high cost of production has been a factor operating against any extensive production of sodium percarbonate as an article of commerce, particularly in the United States.

It is an object of my invention to provide an improved and economical method for producing alkali metal percarbonates. A further object is to provide a method for preparing such percarbonates from relatively cheap raw materials, particularly as regards the source of active oxygen, whereby excellent yields of the desired percarbonate may be obtained in a convenient manner. A particular object is to provide a dry method for preparing alkali metal percarbonates, especially sodium percarbonate having the formula $Na_2CO_3 \cdot 1.5H_2O_2$, employing the alkali metal peroxide, hydrogen peroxide and carbon dioxide as raw materials. These and other objects will be apparent from the ensuing description of my invention.

The above objects may be accomplished in accordance with my invention by reacting an alkali metal peroxide with an aqueous hydrogen peroxide solution of suitable concentration and then reacting the resulting product with carbon dioxide whereby the desired alkali metal percarbonate may be obtained. The first reaction involves the formation of an addition compound of the alkali metal peroxide with hydrogen peroxide and water, which addition compound may be carbonated, i. e., reacted with carbon dioxide, to form the alkali metal percarbonate consisting of alkali metal carbonate containing hydrogen peroxide of addition.

The reactions involved in the practice of my improved method for preparing these percarbonates may be better understood from a consideration of the reactions taking place when sodium percarbonate is prepared from sodium peroxide, hydrogen peroxide and carbon dioxide. These are represented by the following equations:

(a) $Na_2O_2 + 0.5H_2O_2 + H_2O \rightarrow Na_2O_2 \cdot 0.5H_2O_2 \cdot H_2O$
(b) $Na_2O_2 \cdot 0.5H_2O_2 \cdot H_2O + CO_2 \rightarrow Na_2CO_3 \cdot 1.5H_2O_2$ In Equation (a), sodium peroxide is reacted with one-half mole of hydrogen peroxide and one mole of water to form sodium peroxide having one-half mole of hydrogen peroxide and one mole of water of addition. This compound is new so far as I am aware. The product formed in Equation (a) is reacted according to Equation (b) with carbon dioxide to obtain sodium percarbonate having the formula $Na_2CO_3 \cdot 1.5H_2O_2$. Both of these reactions should be carried out under conditions whereby the reaction mixture is maintained in a substantially dry condition. Furthermore, the reaction mixture in both cases should be maintained at a temperature not substantially above about 20° C., and preferably at 0° to 10° C., otherwise, control of the reaction rate becomes difficult and excessive decomposition may result.

The hydrogen peroxide solution employed in the reaction illustrated by Equation (a) should contain about one mole of water per mole of sodium peroxide in addition to sufficient hydrogen peroxide to furnish the hydrogen peroxide required in the final product which is in excess of one mole per mole of sodium carbonate. Thus, if sodium percarbonate of the formula set forth in Equation (b) is desired, the hydrogen peroxide employed in Equation (a) should contain one-half mole of hydrogen peroxide and one mole of water per mole of sodium peroxide. On the other hand, if a percarbonate of the formula $Na_2CO_3 \cdot 2H_2O_2$ is desired, the hydrogen peroxide solution used in Equation (a) should contain one mole of hydrogen peroxide and one mole of water for every mole of sodium peroxide reacted.

Sodium peroxide, as available commercially, may contain small amounts of impurities such as sodium hydroxide and sodium monoxide. Accordingly, it is generally preferable to employ slightly more than the above indicated amounts of hydrogen peroxide in the first reaction in order that sufficient hydrogen peroxide may be provided to react with the sodium peroxide and also to provide the requisite amount of hydrogen peroxide to react with the sodium monoxide and sodium hydroxide present in the sodium peroxide. Thus, if sodium percarbonate of the formula $Na_2CO_3 \cdot 1.5H_2O_2$ is desired, the hydrogen peroxide employed in the first reaction should be sufficient to furnish one-half mole of hydrogen peroxide per each mole of sodium peroxide together with one and one-half moles of hydrogen peroxide for each mole of sodium monoxide present in the sodium peroxide employed. Ordinarily it is adequate to assume that all material not present as sodium peroxide is sodium monoxide, which of course would include sodium hydroxide which is present merely as traces. Since the addition product is obtained in practically quantitative yields, it is usually unnecessary to employ more than the theoretical quantities of hydrogen peroxide as indicated above, although slight excesses are not objectionable.

Since sodium peroxide is a highly alkaline material and since the stability of peroxygen compounds generally is poor in the presence of alkaline materials, it is necessary that both the reaction involving hydrogen peroxide solution and that involving carbon dioxide be carried out under conditions such that no substantial amount of solution is formed or accumulated in the reaction mixture. In other words, the reaction mixture should be maintained in a substantially dry condition throughout the entire procedure. This is especially so when temperature control of the reaction mixture is not especially effective.

The most critical point in both of the reactions is at the beginning when it is necessary that the rate of reaction be carefully controlled. Thus, in the reaction represented by Equation (a) above, particular care should be observed during the addition of approximately the first five percent of the hydrogen peroxide solution. After about one-fourth to one-third of the required amount of hydrogen peroxide has been added, the rate of addition may be increased substantially and, if the sodium peroxide is of suitable particle size and with efficient stirring and cooling, the addition may be relatively rapid thereafter, in some instances it being permissible almost to pour on the hydrogen peroxide solution during the latter stages. In the carbonation reaction, after carbonation has proceeded to a substantial extent, the rigid control of temperature required during the initial stages may be relaxed somewhat without substantially increasing the danger of decomposition of the reaction mixture.

The hydrogen peroxide solution should be in a finely divided condition when contacted with the sodium peroxide so as to prevent the accumulation of substantial quantities of liquid in any part of the solid mixture. This may be accomplished effectively by atomizing the hydrogen peroxide solution onto the sodium peroxide while the latter is stirred and cooled. While this constitutes my preferred method, other methods may be employed effectively. For example, finely divided sodium peroxide may be permitted to fall through a spray of finely divided hydrogen peroxide solution. If one passage through the spray is insufficient, the procedure may be repeated until reaction of the sodium peroxide with the desired amount of hydrogen peroxide solution has been effected. If localized accumulation of liquid is permitted to occur, a vigorous decomposition accompanied by evolution of heat and oxygen starts almost immediately at the point of accumulation and spreads rapidly throughout the entire mass. However, when applying the hydrogen peroxide solution in a finely divided condition and employing efficient stirring and cooling, no serious decomposition difficulties are encountered.

The preparation of alkali metal percarbonates in accordance with my invention may be illustrated by the following examples which are illustrative and not restrictive. In the examples, sodium percarbonate is prepared employing sodium peroxide, hydrogen peroxide and carbon dioxide as raw materials.

Example I

Sodium peroxide containing 19.95% of active oxygen was placed in an open enameled pan, the latter being placed so that its sides and bottom were bathed by an ice bath. The amount of sodium peroxide, which was of particle size corresponding to 60 mesh, was 122.45 grams. After the sodium peroxide had been permitted to come to approximately the temperature of the ice bath, a solution of hydrogen peroxide containing 23.6% by weight of active oxygen was sprayed onto the sodium peroxide until 60.6 g. had been taken up. Care was exercised especially during the initial stages of the spraying operation so that there was no accumulation of liquid in the mixture and decomposition of the reaction mixture was not initiated. During the entire operation the sodium peroxide was raked back and forth by means of a glass rake to expose fresh surfaces to the hydrogen peroxide solution and also to bring the reaction mixture into fresh contact with the cooled surfaces of the enameled pan. The time required for the addition of hydrogen peroxide was approximately one and one-half hours. The product obtained weighted 184.2 g. and contained 19.82% of active oxygen, representing a yield of 94.3% based on the active oxygen initially present in the sodium peroxide and hydrogen peroxide. The composition of the product was found to correspond to the formula $$Na_2O_2 \cdot 1.5H_2O_2 \cdot H_2O + 0.06Na_2CO_3 \cdot H_2O$$

22.9 grams of the above product was placed in a glass flask immersed in an ice bath. The flask was fitted with a flexible rubber tubing leading to a source of substantially dry carbon dioxide. An exit tube from the container was protected from the atmosphere by means of an alumina gel drying tower. During carbonation, the flask was constantly agitated. After absorption of carbon dioxide had ceased, the product weighed 31.8 grams and contained 14.1% of active oxygen. The active oxygen recovery in the carbonation step was 98.8%. The percarbonate obtained corresponded to the formula $$0.97Na_2CO_3 \cdot 0.03NaHCO_3 \cdot 1.5H_2O_2$$

*Example II*

100 grams of 60 mesh sodium peroxide containing 19.77% of active oxygen was mixed thoroughly with 1.83 grams of sodium silicate of the composition $Na_2SiO_3 \cdot 9H_2O$. The mixture was placed in an enameled pan immersed in an ice bath as in Example I. This mixture was then sprayed with 56.4 grams of hydrogen peroxide solution which contained 24.5% of active oxygen in addition to 0.924 grams of magnesium sulfate. The addition of the hydrogen peroxide solution to the sodium peroxide was carried out as in Example I. The product obtained weighed 157.3 grams, contained 20.26% active oxygen and corresponded to a recovery of 96.2% of the active oxygen. Analyses indicated its composition to correspond to the formula $$Na_2O_2 \cdot 0.5H_2O_2 \cdot H_2O + 0.085Na_2CO_3 \cdot 1.5H_2O_2 +$$
about 1% magnesium silicate Carbonization of this product by the method described in Example I resulted in a product containing 14.8% active oxygen, the active oxygen recovery during the carbonation step being 98.7%. The final product had a composition, indicated by analyses, corresponding to the formula $$Na_2CO_3 \cdot 1.5H_2O_2 + 0.13Na_2O \cdot H_2O +$$
about 0.74% of magnesium silicate From the above examples it is apparent that sodium percarbonate of a composition approximating that represented by the formula $$Na_2CO_3 \cdot 1.5H_2O_2$$

may be prepared with excellent active oxygen yields in the manner described. It is to be noted that in Example I no stabilizer was employed during either the addition or the carbonation step. It should be stated, however, that due to the sensitivity of peroxygen compounds to substances which catalyze decomposition, it is generally desirable to employ a stabilizer in the reaction mixture in order to decrease as much as possible the tendency to decompose. Any of the many known stabilizers for peroxygen compounds may be employed with good effect, although I prefer to employ magnesium silicate. The use of magnesium silicate formed in the reaction mixture as in Example II above is intended as being illustrative and not restrictive.

The use of sodium peroxide of particle size not substantially greater than about 60 mesh is advantageous. Larger mesh sodium peroxide is not especially absorptive so that it is more difficult to maintain the reaction mixture in a substantially dry condition during the reaction with hydrogen peroxide solution. The particle size of the original sodium peroxide determines largely the particle size of the intermediate addition product which in turn influences the rate of reaction with carbon dioxide. When 60 mesh or finer sodium peroxide is employed, the intermediate addition product is of sufficient fineness to react at a practical rate with carbon dioxide. Sodium peroxide of particle size corresponding to from 60 to 80 mesh is preferred. Finer material may be used effectively but slightly poorer active oxygen recoveries will generally result. For reasons not understood, product made from such finer grades of sodium peroxide is not quite as stable as product from sodium peroxide of 60 to 80 mesh.

Contact of the reaction mixture or the hydrogen peroxide solution with metals or surfaces known to be active decomposition catalysts for peroxygen compounds should be avoided. Enamel or glass lined equipment is entirely satisfactory. Care should be exercised to prevent contamination of the reaction mixture or product with dust particles or other foreign materials which may react with or catalyze the decomposition of the mixture.

Effective agitation of the reaction mixture during both the addition reaction and the carbonation reaction is essential to the practical success of my process. Agitation is necessary not only to expose new surfaces to the reactant being added but also to render more effective the cooling of the reaction mixture. It is to be understood however that the process is not restricted to the specific means disclosed in the examples for effecting agitation since agitation may be effected by any of various known means in any of numerous reaction vessels known to be suitable for carrying out reactions of this type.

Both the addition reaction and the carbonation reaction are preferably carried out at a temperature approximating 0° C. to 10° C. However, temperatures as high as about 20° C. may be employed providing suitable control of the rate of reaction is maintained. Before starting the addition of hydrogen peroxide solution to sodium peroxide, or of carbon dioxide to the intermediate sodium peroxide addition product, the solid reactant should be brought to a temperature not higher than about 20° C. and preferably 0 to 5° C. I have illustrated in the examples above the use of a specific means for cooling the reaction mixture. Obviously any of the various well known means for effecting cooling of reaction mixtures may be used with good results.

The advantages of the present process are obvious when it is considered that relatively cheap raw materials are used therein in the preparation of alkali metal percarbonates. Thus, whereas in the methods known heretofore for producing sodium percarbonate of the formula $$Na_2CO_3 \cdot 1.5H_2O_2$$

hydrogen peroxide was used as the sole source of the active oxygen, in the present process only approximately one-third of the required active oxygen is furnished by hydrogen peroxide. The remaining two-thirds is supplied by the relatively cheap sodium peroxide. A further advantage of the process is the fact that the reaction mixture is maintained in a substantially dry condition throughout the entire process which obviates the necessity of employing expensive filtration, evaporation and crystallization procedures characteristic of processes known heretofore. In the present process a substantially dry product is obtained directly. However, it may be desirable upon occasion to subject either the intermediate addition product of sodium peroxide with hydrogen peroxide and water, or the final percarbonate, to a mild drying treatment, e. g., to the action of a stream of warm air or to treatment in vacuo, in order to remove slight excesses of water.

It should be pointed out that the carbonation reaction is difficult to carry out if the carbon dioxide employed is dried to an excessive degree. On the other hand the presence of too much water in the carbon dioxide is undesirable since during the stages of incomplete carbonation a wet product tends to decompose due to the high alkalinity. Therefore, it is essential that an excess of water be avoided. I have found that carbon dioxide passed through alumina gel towers whose ability to absorb water has been partially spent contains just about the right amount of water to permit the carbonation reaction to proceed as desired.

The reaction product of sodium peroxide and hydrogen peroxide solution having the approximate composition $Na_2O_2 \cdot 0.5H_2O_2 \cdot H_2O$ is a white substance which, when free of excess water, is remarkably stable at ordinary refrigerator conditions. Such a product, even in the absence of a stabilizer, has been kept at a temperature of 6 to 8° C. for weeks without detectable loss of active oxygen. A progressive carbonation, which is exothermic, occurs when the product is exposed to air so that it should not be stored in deep layers unless protected from carbon dioxide and also water vapor. The stability is improved somewhat by the presence of stabilizers such as magnesium compounds, e. g., magnesium silicate.

I have illustrated in the above decsription and examples the preferred modification of my invention. It is to be understood that they are intended to be illustrative and not restrictive and that various modifications thereof and variations therefrom which conform to the spirit of my invention are intended to be included within the scope of the appended claims.

I claim:

1. A method for preparing alkali metal percarbonates comprising reacting an alkali metal peroxide with a finely divided aqueous hydrogen peroxide solution and subjecting the resulting reaction product to the action of carbon dioxide.

2. A method for preparing alkali metal percarbonates comprising reacting an alkali metal peroxide with a finely divided aqueous hydrogen peroxide solution containing not more than about one mole of water per mole of alkali metal peroxide being reacted and subjecting the resulting reaction product to the action of carbon dioxide.

3. A method for preparing sodium percarbonate comprising reacting sodium peroxide with a finely divided aqueous hydrogen peroxide solution and subjecting the resulting reaction product to the action of carbon dioxide.

4. A method for preparing sodium percarbonate comprising reacting sodium peroxide with a finely divided aqueous hydrogen peroxide solution containing not more than about one mole of water per mole of sodium peroxide being reacted and subjecting the resulting reaction product to the action of carbon dioxide.

5. A method for preparing alkali metal percarbonates comprising reacting an alkali metal peroxide in the presence of a stabilizer with a finely divided aqueous hydrogen peroxide solution containing about one mole of water per mole of said alkali metal peroxide and subjecting the resulting product to the action of carbon dioxide, the reaction mixture being maintained in a substantially dry condition at a temperature not higher than about 20° C. during the reaction periods.

6. A method for preparing alkali metal percarbonates comprising reacting an alkali metal peroxide in the presence of a stabilizer with a finely divided aqueous hydrogen peroxide solution containing about one mole of water per mole of said alkali metal peroxide and subjecting the resulting product to the action of carbon dioxide, the reaction mixture being maintained in a substantially dry condition at a temperature of about 0 to 10° C. during the reaction periods.

7. A method for preparing sodium percarbonate comprising reacting sodium peroxide with a finely divided aqueous hydrogen peroxide solution containing about one mole of water per mole of said sodium peroxide and subjecting the resulting product to the action of carbon dioxide, the reaction mixture being maintained in a substantially dry condition at a temperature not higher than about 20° C. during the reaction periods.

8. A method for preparing sodium percarbonate comprising reacting sodium peroxide with a finely divided aqueous hydrogen peroxide solution containing about one mole of water per mole of said sodium peroxide and subjecting the resulting product to the action of carbon dioxide, the reaction mixture being maintained in a substantially dry condition at a temperature of 0 to 10° C. during the reaction periods.

9. A method for preparing sodium percarbonate comprising reacting sodium peroxide with a finely divided aqueous hydrogen peroxide solution containing about one mole of water and about one-half to one mole of hydrogen peroxide per mole of sodium peroxide being reacted, said reaction being effected while agitating and maintaining said sodium peroxide at a temperature not higher than about 20° C., and thereafter reacting the resulting product with carbon dioxide while agitating and maintaining the reaction mixture at a temperature not higher than about 20° C.

10. A method for preparing sodium percarbonate comprising reacting sodium peroxide with a finely divided aqueous hydrogen peroxide solution containing about one mole of water and about one-half to one mole of hydrogen peroxide per mole of sodium peroxide being reacted, said reaction being effected while agitating and maintaining said sodium peroxide at a temperature not higher than about 0 to 10° C., and thereafter reacting the resulting product with carbon dioxide while agitating and maintaining the reaction mixture at a temperature not higher than about 0 to 10° C.

11. A method for preparing sodium percarbonate comprising reacting sodium peroxide of about 60 to 80 mesh with a finely divided aqueous hydrogen peroxide solution containing about one mole of water and about one-half mole of hydrogen peroxide per mole of sodium peroxide being reacted, said reaction being effected while agitating and maintaining said sodium peroxide at a temperature not higher than about 20° C. and thereafter reacting the resulting product with carbon dioxide while agitating and maintaining the reaction mixture at a temperature not higher than about 20° C.

12. A method for preparing sodium percarbonate comprising reacting sodium peroxide of about 60 to 80 mesh with a finely divided aqueous hydrogen peroxide solution containing about one mole of water and about one-half mole of hydrogen peroxide per mole of sodium peroxide being reacted, said reaction being effected while agitating and maintaining said sodium peroxide at a temperature not higher than about 0 to 10° C., and thereafter reacting the resulting product with carbon dioxide while agitating and maintaining the reaction mixture at a temperature not higher than about 0 to 10° C.

13. A method for preparing sodium percarbonate comprising treating sodium peroxide with a finely divided aqueous hydrogen peroxide solution containing about one mole of water and about one-half mole of hydrogen peroxide per mole of said sodium peroxide, said treatment being effected at such a rate as to maintain the reaction mixture in a substantially dry condition and while agitating and maintaining said mixture at a temperature of about 0 to 10° C. and thereafter reacting the resulting sodium peroxide addition product with carbon dioxide during agitation at a temperature of 0 to 10° C.

14. A method for preparing sodium percarbonate comprising reacting sodium peroxide with an aqueous hydrogen peroxide solution while maintaining a substantially dry reaction mixture to obtain an addition product consisting of $Na_2O_2$, $HO_2$, and $H_2O$ present substantially in the molecular ratio 1:0.5:1 and converting said addition product to sodium percarbonate by reaction with carbon dioxide.

15. In a method for preparing alkali metal percarbonates, the combination of steps comprising reacting an alkali metal peroxide with an aqueous hydrogen peroxide solution to form an addition product of said alkali metal peroxide with water and hydrogen peroxide, and thereafter reacting said addition product with carbon dioxide.

16. In a method for preparing sodium percarbonate, the combination of steps comprising reacting sodium peroxide with an aqueous hydrogen peroxide solution to obtain an addition product consisting of $Na_2O_2$, $H_2O_2$, and $H_2O$ substantially in the molecular ratio 1:0.5:1 and thereafter reacting said addition product with carbon dioxide.

17. In a method for preparing sodium percarbonate, the step which comprises reacting sodium peroxide with an aqueous hydrogen peroxide solution to obtain an addition product consisting of $Na_2O_2$, $H_2O_2$, and $H_2O$ substantially in the molecular ratio 1:0.5:1.

18. In a method for preparing sodium percarbonate the step which comprises reacting an addition product of sodium peroxide, water and hydrogen peroxide, said addition product comprising said chemical compounds substantially in the molecular ratio 1:1:0.5 with carbon dioxide.

19. The new addition compound of sodium peroxide, hydrogen peroxide and water in which said chemical compounds are present substantially in the molecular ratio 1:0.5:1.

JOSEPH S. REICHERT.